United States Patent [19]

Sakai

[11] Patent Number: 4,619,157
[45] Date of Patent: Oct. 28, 1986

[54] SYSTEM FOR DETECTING THE TRANSMISSION RATIO IN AN INFINITELY VARIABLE TRANSMISSION

[75] Inventor: Yasuhito Sakai, Higashimurayama, Japan

[73] Assignee: Fuji Jukogyo Kabushiki Kaisha, Tokyo, Japan

[21] Appl. No.: 682,881

[22] Filed: Dec. 18, 1984

[30] Foreign Application Priority Data

Dec. 21, 1983 [JP] Japan ................................ 58-242828

[51] Int. Cl.$^4$ ............................................. F16H 11/06
[52] U.S. Cl. ...................................... 74/689; 74/867; 474/18; 474/28
[58] Field of Search ...................... 474/18, 28; 74/689, 74/867; 91/387, 388, 410; 173/18

[56] References Cited

U.S. PATENT DOCUMENTS

| | | | |
|---|---|---|---|
| 4,152,947 | 5/1979 | van Deursen et al. | 474/28 X |
| 4,161,894 | 7/1979 | Giacosa | 474/12 X |
| 4,369,675 | 1/1983 | van Deursen | 474/28 X |
| 4,400,164 | 8/1983 | Cadee | 474/28 X |
| 4,467,670 | 8/1984 | Kawamoto | 74/689 |
| 4,467,674 | 8/1984 | van Deursen et al. | 74/867 |
| 4,478,105 | 10/1984 | Yamamuro et al. | 74/689 X |
| 4,494,943 | 1/1985 | Takei et al. | 474/18 X |
| 4,512,751 | 4/1985 | Tanaka et al. | 474/28 |

Primary Examiner—Rodney H. Bonck
Assistant Examiner—Dwight G. Diehl
Attorney, Agent, or Firm—Martin A. Farber

[57] ABSTRACT

A system for an infinitely variable belt-drive transmission for an engine comprises a primary pulley having a hydraulically shiftable disc, a secondary pulley having a hydraulically shiftable disc, a belt engaged with both pulleys, and a hydraulic circuit having a pump for supplying oil. A transmission ratio control valve is responsive to engine speed for controlling the oil and for shifting the disc of the primary pulley to change the transmission ratio, and a pressure regulator valve is responsive to the transmission ratio for increasing line pressure in the hydraulic circuit with an increase of the transmission ratio. A sensor is engaged with the disc of the primary pulley to be moved together with the disc so as to move a spool of the pressure regulator valve to increase the line pressure with an increase of engine speed.

1 Claim, 2 Drawing Figures

SYSTEM FOR DETECTING THE TRANSMISSION RATIO IN AN INFINITELY VARIABLE TRANSMISSION

BACKGROUND OF THE INVENTION

The present invention relates to a system for detecting the transmission ratio in an infinitely variable belt-drive transmission for a vehicle during driving. European Patent Application Publication No. 0005565 discloses a control system for an infinitely variable transmission.

The infinitely variable belt-drive transmission comprises an endless belt running over a primary pulley and a secondary pulley. Each pulley comprises a movable conical disc which is axially moved by a fluid operated servo device so as to vary the running diameter of the belt on the pulley depending on driving conditions. The system is provided with an oil pressure regulator value and a transmission ratio control valve. Each valve comprises a spool to control the oil pressure by shifting the spool.

The primary pulley has a Pitot pressure generating device for producing Pitot pressure dependent on engine speed. The Pitot pressure is applied to one axial end of the spool of each valve to urge the spools to shift. On the other hand, the actual transmission ratio is detected by the axial position of the movable conical disc of the primary pulley which represents the running diameter of the belt on the primary pulley. A conventional transmission ratio detecting system comprises a rod which is moved dependent on the axial movement of the movable conical disc and a link for transmitting the movement of the rod to the other axial end of the spool of the pressure regulator valve. Such a mechanism is complicated in construction.

SUMMARY OF THE INVENTION

An object of the present invention is to provide a system for detecting the transmission ratio which is simplified in construction.

Another object of the present invention is to provide a system which operates also as a lubricating system for a sensor head which slides on a side of a movable conical disc of a primary pulley.

According to the present invention, there is provided a system for detecting the transmission ratio in an infinitely variable transmission for transmitting the power of an internal combustion engine, the transmission comprising a primary pulley having a hydraulically shiftable disc and a hydraulic cylinder for shifting the disc, a secondary pulley having a hydraulically shiftable disc and a hydraulic cylinder for operating the disc, a belt engaged with both pulleys, a hydraulic circuit having a pump for supplying oil, a transmission ratio control valve responsive to engine speed for controlling the oil and for shifting the disc of the primary pulley to change the transmission ratio, and a pressure regulator valve having a spool responsive to the transmission ratio for increasing the line pressure of the hydraulic circuit with increase of the transmission ratio. The system comprises a sensor provided to move in parallel with the axial direction of the primary pulley, the sensor having a sensor head engaged with the disc of the primary pulley and an arm engaged with a retainer of a spring which biases the spool of the pressure regulator valve so as to shift the spool in dependence on the movement of the disc to control the line pressure.

The sensor is slidably mounted on a guide tube, and passages are provided in the guide tube and the sensor so as to communicate a part of the hydraulic circuit with the end opening of the passage of the sensor for lubricating contact surfaces of the head of the sensor and disc.

The other objects and features of this invention will be apparently understood from the following description with reference to the accompanying drawings.

DETAILED DESCRIPTION OF THE PREFERRED EMBODIMENT

Figure 1:
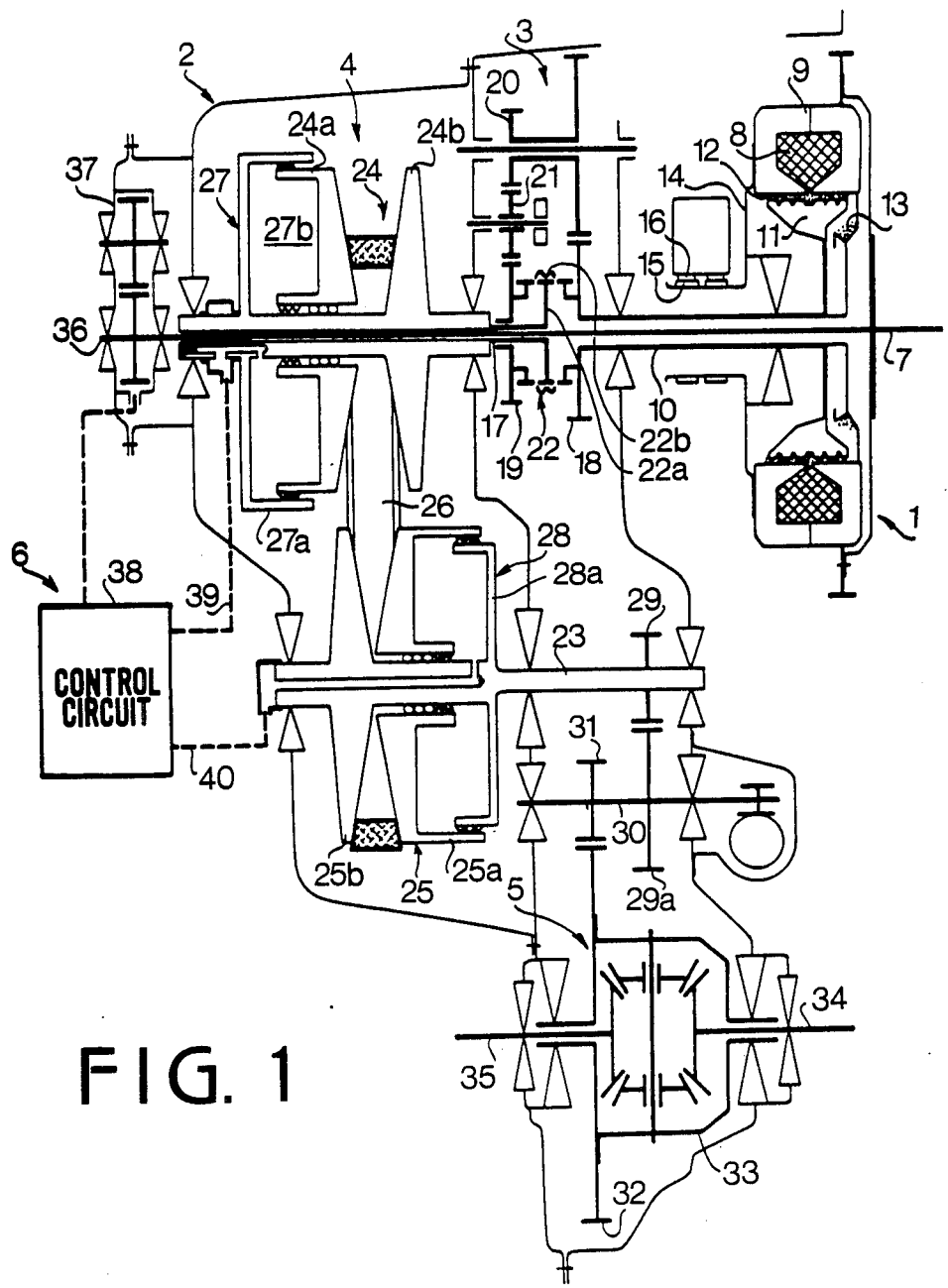
FIG. 1 is a schematic illustration of an infinitely variable belt-drive transmission.

Referring to FIG. 1, the infintely variable belt-drive automatic transmission for a vehicle to which the present invention is applied, comprises an electromagnetic powder clutch 1, an infinitely variable belt-drive transmission 2, a selector mechanism 3, pulleys and belt device 4, final reduction device 5, and an oil control circuit 6. The crankshaft 7 of an engine (not shown) is connected to an annular drive member 9 of the electromagnetic powder clutch 1. The electromagnetic powder clutch comprises a coil 8 provided in the drive member 9, a driven member 11 having its outer periphery spaced from the inner periphery of the drive member 9 by a gap 12, and a powder chamber 13 defined between the drive member 9 and drive member 11. The powder chamber 13 is provided with powder made of magnetic material. The driven member 11 is secured to an input shaft 10 of the belt-drive transmission. A holder 14 secured to the drive member 9 carries slip rings 15 which are electrically connected to the coil 8. The coil 8 is supplied through brushes 16 and slip rings 15 with control current from a electronic control circuit.

When the magnetizing coil 8 is excited by clutch current, drive member 9 is magnetized to produce a magnetic flux passing through the drive member 11. The magnetic powder is aggregated in the gap 12 by the magnetic flux and the drive member 11 is engaged with the drive member 9 by the powder. On the other hand, when the clutch current is cut off, the drive and driven members 9 and 11 are disengaged from one another.

In the belt-drive transmission 2, the selector device 3 is provided between the input shaft 10 and a main shaft 17. The main shaft 17 is cylindrical and is disposed coaxially with the input shaft 10. The selector device 3 comprises a drive gear 18 integral with the input shaft 10, reverse driven gear 19 rotatably mounted on the main shaft 17, and a synchronizer 22 mounted on the main shaft 17. The drive gear 18 meshes with one of the gears of a counter gear assembly 20. Another gear of the counter gear assembly 20 engages with an idler gear 21, which in turn engages with the driven gear 19.

The synchronizer 22 has a well known mechanism and comprises a hub 22a secured to the main shaft 17, and a synchronizer sleeve 22b slidably engaged to the hub with splines. The synchronizer sleeve is adapted to engage with splines of the drive gear 18 or with splines of the driven gear 19.

At a neutral position (N range) of a selector lever (not shown), the synchronizer 22 does not engage either gear as shown in FIG. 1, so that the main shaft 17 is disconnected from the input shaft 10. When the synchronizer is engaged with the gear 18, the input shaft 10 is connected to the main shaft 17 through the synchronizer to provide a driving position (D range).

When the synchronizer is engaged with the gear 19, the input shaft 10 is connected to the main shaft 17 through gears 18, 20, 21 and 19 to provide a reverse driving position (R range).

The main shaft 17 is in the form of hollow pipe in which an oil pump driving shaft 36 connected to the crankshaft 7 is mounted. An output shaft 23 is provided in parallel with the main shaft 17. A primary pulley 24 and a secondary pulley 25 are mounted on the shafts 17 and 23 respectively. A fixed conical disc 24b of the primary pulley 24 is integral with the main shaft 17 and an axially movable conical disc 24a is axially slidably mounted on the main shaft 17. The movable conical disc 24a also slides in a cylinder 27a formed on the main shaft 17 to provide a servo device 27. A chamber 27b of the servo device 27 communicates with an oil pump 37 through a passage 39 and a control circuit 38. The oil pump 37 is driven by the shaft 36.

A fixed conical disc 25b of the secondary pulley 25 is formed on the output shaft 23 opposite the movable disc 24a and a movable conical disc 25a is slidably mounted on the shaft 23 opposite disc 24b. Movable conical disc 25a has a cylindrical portion in which a piston portion 28a of the output shaft 23 is slidably engaged to form a servo device 28. A chamber of the servo device 28 is communicated with the oil pump 37 through a passage 40 and the control circuit 38. A drive belt 26 engages with the primary pulley 24 and the secondary pulley 25.

Secured to the output shaft 23 is a drive gear 29 which engages with an intermediate reduction gear 29a on an intermediate shaft 30. An intermediate gear 31 on the shaft 30 engages with a final gear 32. Rotation of the final gear 32 is transmitted to axles 34 and 35 of the vehicle, driving vehicle wheels (not shown) through a differential 33.

The pressure oil control circuit 38 is responsive to engine speed and throttle valve position for controlling the oil supply to the servo devices 27 and 28 thereby moving discs 24a and 25a. Thus, the transmission ratio is infinitely changed.

Figure 2:
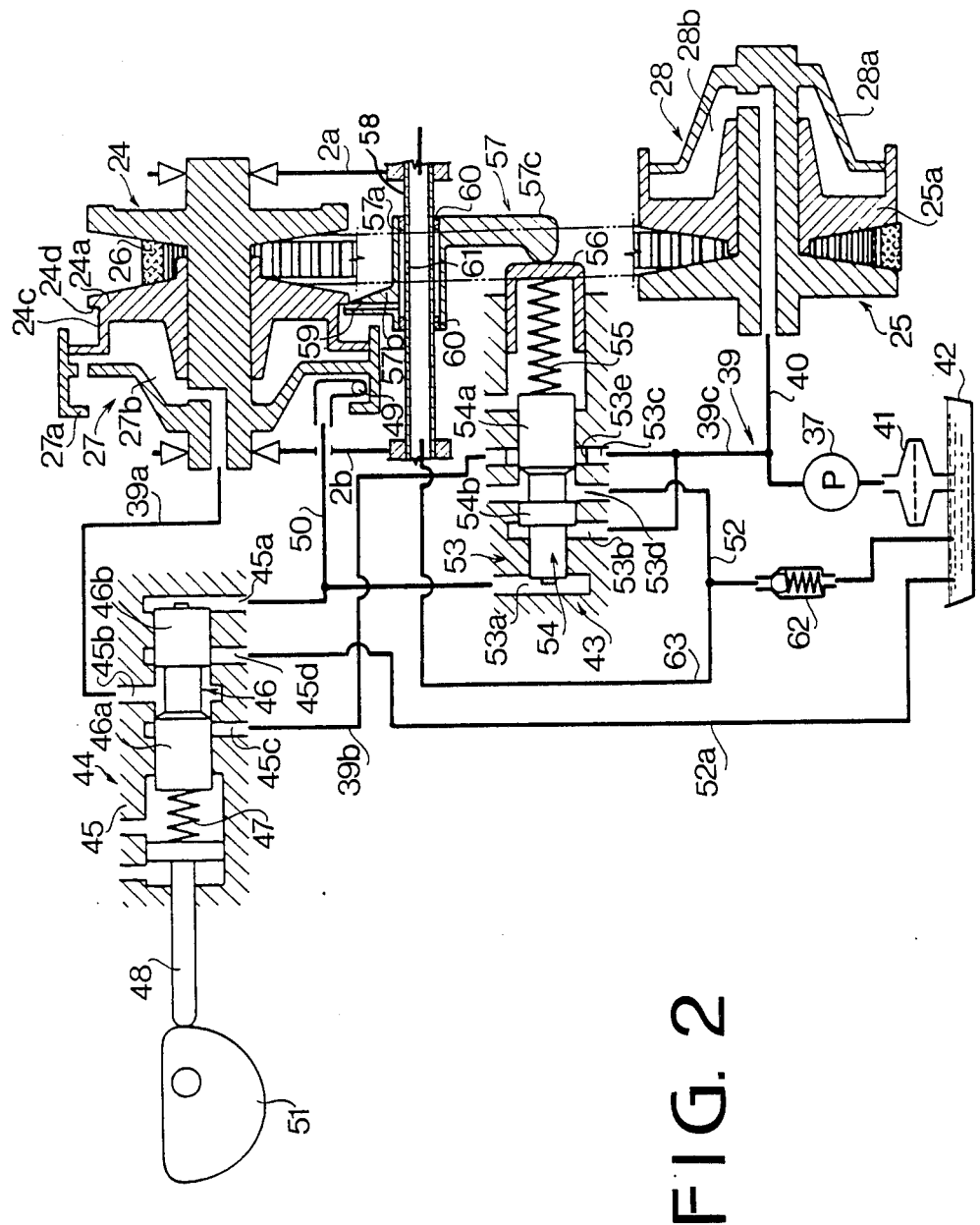
FIG. 2 is a schematic diagram showing a control system according to the present invention.

Referring to FIG. 2, a chamber 27b of the servo device 27 is applied with pressurized oil by the oil pump 37 from an oil reservoir 42 passing through a filter 41, conduit 39, pressure regulator valve 43 and transmission ratio control valve 44. A chamber 28b of the servo device 28 is applied with pressurized oil through conduit 40 without passing through the valves 43 and 44. The movable conical disc 24a is so designed that the pressure receiving area thereof is larger than that of the movable conical disc 25a.

The transmission ratio control valve 44 comprises a valve body 45, spool 46, spring 47 for urging the spool in the downshift direction, an actuating member 48 for the spool 46 and the spring 47. The actuating member 48 engages a shift cam 51. The shaft cam 51 is operatively connected to an accelerator pedal of the vehicle so as to be rotated in dependency on the magnitude of depression of the pedal. A port 45b of the valve 44 is selectively communicated with a pressure oil supply port 45c of a drain port 45d in accordance with the position of lands 46a and 46b of the spool 46. Port 45b communicates with chamber 27b through a conduit 39a, and port 45c communicates with the pressure regulator valve 43 through a conduit 39b. The drain port 45d communicates with oil reservoir 42 through a conduit 52a. An end chamber 45a is applied with Pitot pressure from a Pitot tube 49 through a passage 50.

Thus, the spool 46 is shifted in dependency on the Pitot pressure which is dependent on the engine speed and on the pressure by the spring 47 dependent on the magnitude of depression of the accelerator pedal. The amount of oil supplied to the chamber 27b increases with an increase of engine speed to provide the upshifting of the transmission.

The pressure regulator valve 43 comprises a valve body 53, spool 54, and a spring 55 for urging the spool 54 in one direction. The spool 54 is so arranged as to move in the direction parallel with the axial direction of the primary pulley. A first end chamber 53b on one side of a land 54b of the spool 54 is applied with pressure of the pressure oil supplied through conduit 39, so that the spool 54 is moved to the right by the oil pressure at the port 53b. The other end of spring 55 engages with a slidable spring retainer 56 which is engaged with an arm 57c of a sensor 57. The sensor arm 57c, comprises a cylindrical shaft 57a having a sensor head 57b and arm 57c. The sensor head 57b engages with a side wall 24d of an annular groove 24c formed on the periphery of the disc 24a for detecting the transmission ratio during operation. The cylindrical shaft 57a has a pair of bearing rings 60 at both ends of the inside thereof. The bearing rings are slidably mounted on a guide tube 58 which is arranged in parallel with the spool 54 and supported by walls 2a and 2b of the primary pulley 24. The sensor head 57b has an oil passage 59 which is communicated with the inside of the cylindrical. The guide tube 58 has an orifice 61 to communicate the insides of the shafts 57a and the guide tube 58 with each other.

On the other hand, a port 53c connected with conduit 39c is communicated with a conduit 39b through an annular groove 53e and communicated with a port 53d in accordance with the position of a land 54a. The port 53d is communicated with the reservoir 42 through a check valve 62 and also communicated with the inside of the guide tube 58 through a passage 63.

A second end chamber 53a is applied with the Pitot pressure from the Pitot tube 49. Accordingly, the spool 54 is applied with the Pitot pressure, with the line pressure applied to the chamber 28b, and with the pressure of the spring 55 dependent on the transmission ratio.

When the engine speed increases, the Pitot pressure increases. Thus, the spool 46 of the transmission ratio control valve 44 is shifted to the left to communicate the port 45c with port 45b, so that the line pressure is applied to the chamber 27b. Since the pressure receiving area of the primary pulley 24 is larger than that of the secondary pulley 28, movable disc 24c is moved to the right. Accordingly, the running diameter of the primary pulley gradually increases, resulting in a decrease of the transmission ratio. The movement of the movable disc 24c to the right causes the sensor 57 to shift to the right, causing movement of the spool 54 of the pressure regulator valve 43 to the right. As a result, the port 53c communicates with the port 53d, causing a part of the oil to drain. Thus, the line pressure decreases, decreasing the pressure of the movable discs 24a and 25a which is exerted on the side of the belt 26. On the other hand, as the transmission ratio increases, the sensor 57 moves to the left to move the spring retainer 56 in the same direction. Thus, the spool 54 is shifted to the left, so that the line pressure is increased. Accordingly, the belt 26 is always held by proper pressure of the movable discs 24a and 25a in accordance with the transmission ratio.

A part of the oil drained from the port 53d flows into the guide tube 58 passing through the passage 63 and further passes through the orifice 61 and passage 59 of the sensor head 57b, and flows in the annular groove 24c of the movable disc 24a. Thus, contact surfaces of the sensor head 57b and side wall 24d are lubricated by the oil.

From the foregoing, it will be understood that the system of the present invention is simplified, since the pressure regulator valve is directly controlled by the sensor arm engaged with the movable disc of the primary pulley. Further, lubrication at contact surfaces of the sensor head and the movable disc can be performed by the simple system.

While the presently preferred embodiment of the present invention has been shown and described, it is to be understood that this disclosure is for the purpose of illustration and that various changes and modifications may be made without departing from the spirit and scope of the invention as set forth in the appended claim.

What is claimed is:

1. An improved system for detecting the transmission ratio in an infinitely variable transmission for transmitting the power of an internal combustion engine, the transmission comprising a primary pulley having a hydraulically shiftable disc and a hydraulic cylinder for shifting the disc, a secondary pulley having a hydraulically shiftable disc and a hydraulic cylinder for operating the disc of the secondary pulley, a belt engaged with both pulleys, a hydraulic circuit having a pump for supplying oil, a transmission ratio control valve responsive to engine speed for controlling the oil and for shifting the disc of the primary pulley to change the transmission ratio, and a pressure regulator valve having a spool responsive to the transmission ratio for increasing the line pressure of the hydraulic circuit with an increase of the transmission ratio, and a spring held by a retainer for urging the spool in a direction, wherein the improvement comprises:

a sensor slidably mounted on a guide tube so as to move in parallel with the axial direction of the primary pulley;

the sensor having a sensor head engaged with the disc of the primary pulley and an arm engaged with the retainer so as to shift the spool in dependency on the movement of the disc of the primary pulley to control the line pressure; and a lubricating system comprising passages provided in the guide tube and the sensor so as to communicate a part of the hydraulic circuit with an end opening of the passage of the sensor for lubricating contact surfaces of the head of the sensor and the disc of the primary pulley.

* * * * *